United States Patent
Kakinami et al.

(10) Patent No.: US 6,172,600 B1
(45) Date of Patent: *Jan. 9, 2001

(54) VEHICLE CONDITION DETECTING APPARATUS

(75) Inventors: Toshiaki Kakinami, Nagoya; Yoshikatsu Kimura, Anjo; Zhong-shan Zhu, Kariya; Ryo Inoue, Nagoya, all of (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/921,324

(22) Filed: Aug. 29, 1997

(30) Foreign Application Priority Data

Aug. 29, 1996 (JP) .................................. 8-228991

(51) Int. Cl.$^7$ ..................................... B60Q 1/00
(52) U.S. Cl. ................. 340/435; 340/436; 340/903; 348/148
(58) Field of Search .................. 340/435, 436; 348/903, 118, 148

(56) References Cited

U.S. PATENT DOCUMENTS

| | | | |
|---|---|---|---|
| 4,692,798 | * 9/1987 | Seko et al. | 350/331 R |
| 5,017,903 | * 5/1991 | Krippelz, Sr. | 340/472 |
| 5,574,426 | * 11/1996 | Shisgal et al. | 340/903 |
| 5,642,093 | * 6/1997 | Kinoshita et al. | 340/905 |
| 5,661,472 | * 8/1997 | Koshizawa | 340/903 |
| 5,782,459 | * 7/1998 | Glatzmeier et al. | 362/80 |
| 5,852,410 | * 12/1998 | Berger | 340/903 |
| 5,874,904 | * 2/1999 | Hirabayashi et al. | 340/903 |
| 5,914,652 | * 6/1999 | Adams | 340/903 |

OTHER PUBLICATIONS

JSAE Convention Proceedings 941, pp. 25–28, published May, 1994.

* cited by examiner

*Primary Examiner*—Edward Lefkowitz
(74) *Attorney, Agent, or Firm*—Sughrue, Mion, Zinn, Macpeak & Seas, PLLC

(57) ABSTRACT

A vehicle condition detecting apparatus utilizes a camera mounted on the rear of a vehicle for providing an image including lines indicative of lane boundaries. The image is processed to determine the distances from the vehicle to each line. The distances are compared with predetermined distances by an image processor. A warning device provides a warning based on variations of observed distances with respect to the predetermined distances to warn the driver if the vehicle begins to drift out of a line.

10 Claims, 12 Drawing Sheets

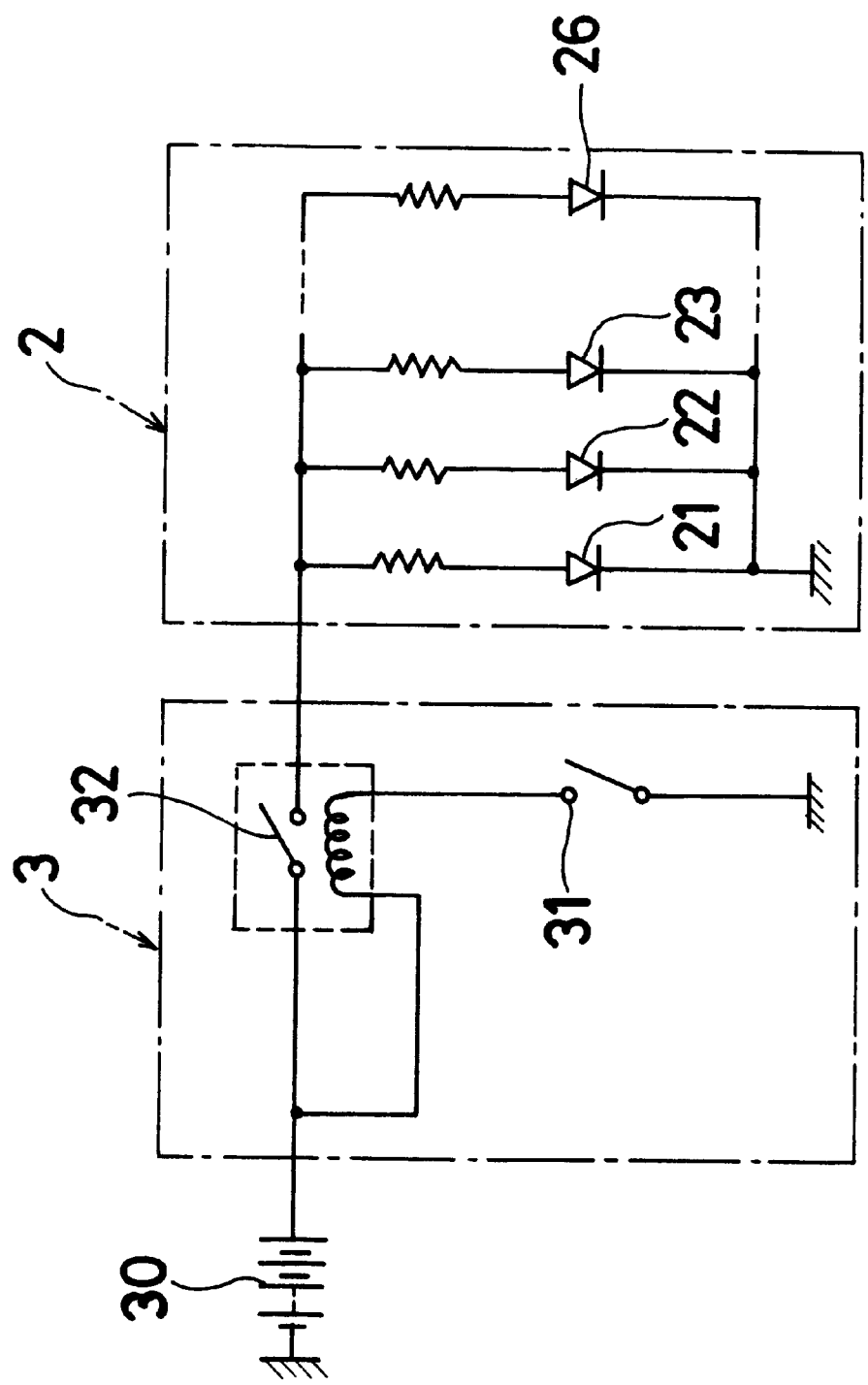

VEHICLE CONDITION DETECTING APPARATUS

BACKGROUND OF THE INVENTION

1. Field of the Invention

The present invention relates to a method and apparatus for detecting a vehicle condition, more particularly to the method and apparatus for detecting a lane on a road by defining boundaries of the opposite sides of the road.

2. Description of the Related Art

In order to define the boundary of the road, an article entitled "Correlation between Vehicle's Meandering and Driver's Arousal Level" is disclosed in the papers of JSAE (Society of Automotive Engineering of Japan, Inc.) Convention Proceedings 941, pp. 25–28 published in May, 1994. Another method is proposed in the Nikkei Industrial newspaper entitled "A Complete Reformed Large Truck" published on Jun. 6, 1996.

In these related publications, an image processing system is proposed for processing image information in a visible region in front of an automotive vehicle so as to be applied for various uses. According to the JSAE paper, the system detects meandering and the driver's alertness level from the front view of the vehicle. According to the newspaper, the truck detects a meandering condition of the vehicle from the front view of the vehicle. However, because the camera is mounted on the front portion of the vehicle, it is not possible to detect an obstacle in the rear area from the image information.

SUMMARY OF THE INVENTION

It is an object of the present invention to detect a vehicle location on the road and an obstacle in the rear area simultaneously.

In order to achieve the above mentioned objects, a vehicle condition detecting apparatus has means for detecting an image mounted on the rear portion of a vehicle and for introducing image information, means for detecting lines indicative of boundaries on the basis of the density of the image information, means for warning when a distance between the vehicle and the lines exceeds a predetermined value and means for lighting a rear region of the vehicle.

BRIEF DESCRIPTION OF THE DRAWINGS

Other objects, features and advantages of the present invention will be more readily appreciated from the following detailed description of the preferred embodiments thereof when taken together with the accompanying drawings, in which:

FIG. 4 is a light control circuit according to the present invention;

DETAILED DESCRIPTION OF THE INVENTION

Figure 1:
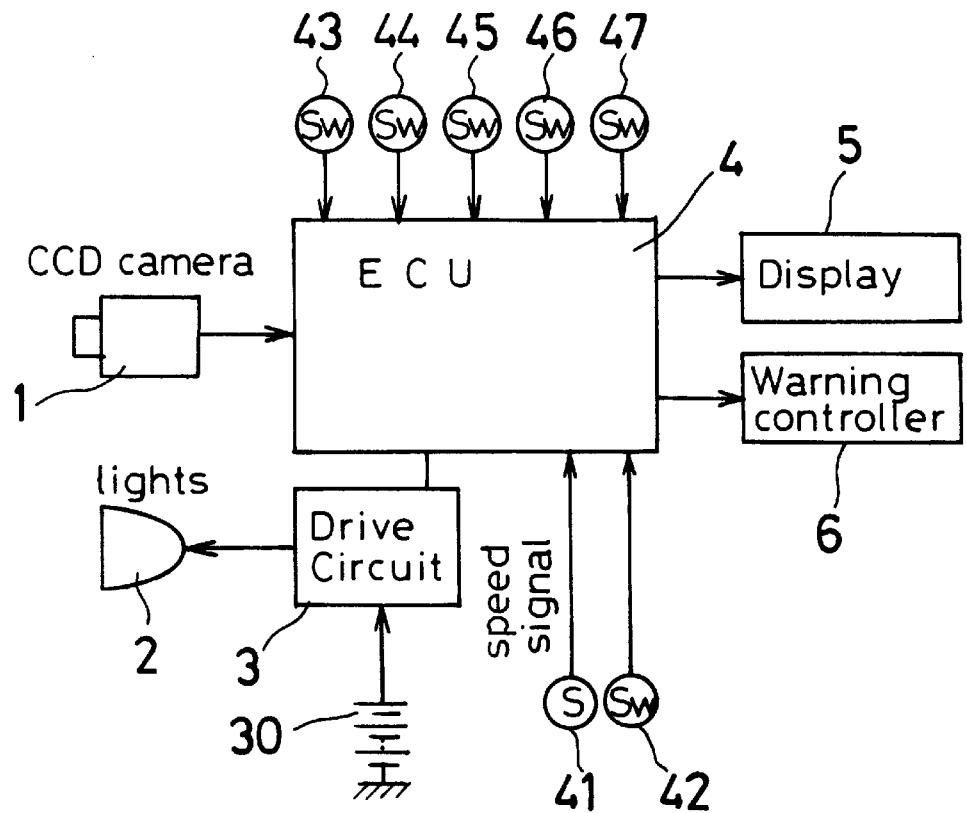
FIG. 1 is a block diagram of an apparatus for detecting a lane on a road according to the present invention.

Referring to the drawings, preferred embodiments of the present invention will be explained in detail. The details of the embodiment disclosed in FIG. 1 are directed to a vehicle condition detecting apparatus adapted to provide a desired image with respect to an object which resides in a visible region which corresponds to a rear view from the vehicle. Referring to FIG. 1, the lane detection apparatus includes a CCD camera 1, a plurality of lights 2, a drive circuit 3, an Electric Control Unit (ECU) 4, a display 5 and a warning controller 6.

Figure 2:
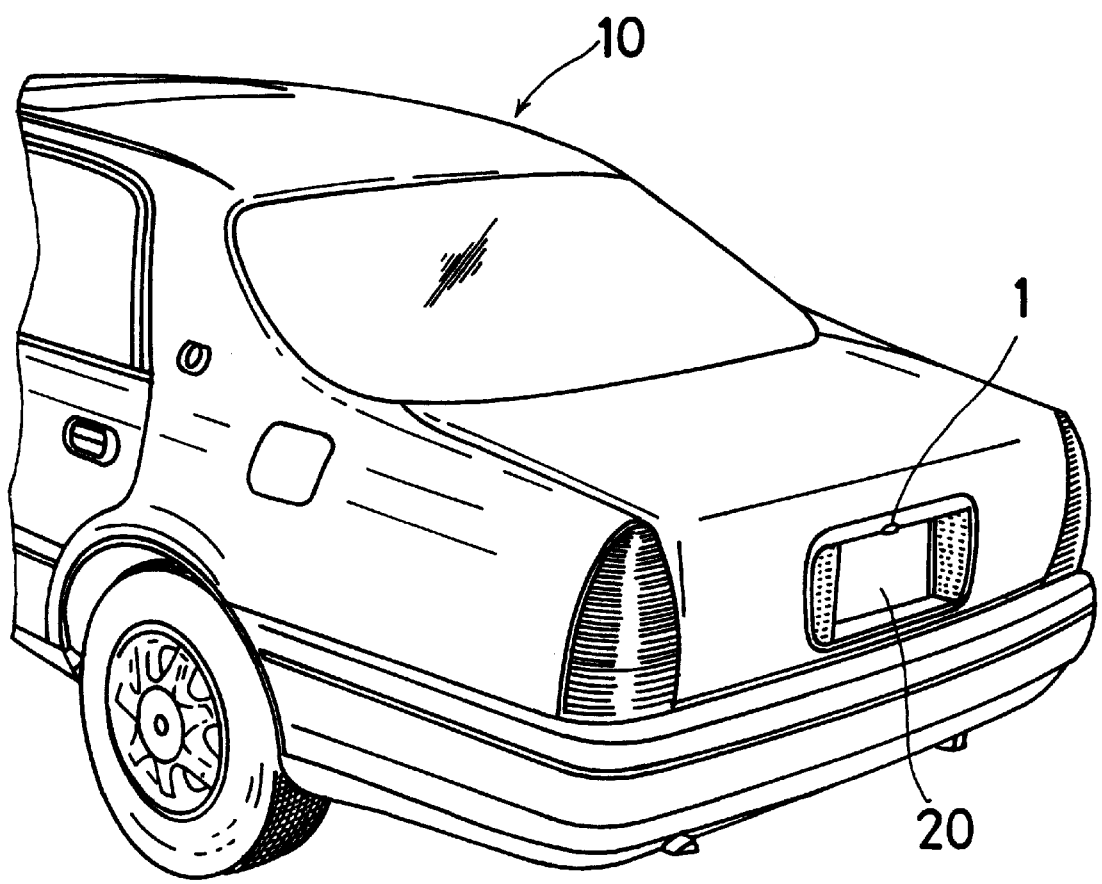
FIG. 2 is a perspective rear view of a vehicle.

As shown in FIG. 2, the CCD camera 1 is mounted on and in the center of an upper portion of a rear license plate holder 20 of a vehicle body 10. When the vehicle moves forward, the CCD camera 1 picks up the images in the rear visible region and a lane on a road by defining boundaries of the opposite sides of the road. The CCD camera 1 faces in a downwardly inclined direction to pick up the images of the lane having white lines. This will cancel the back light of the sun and following vehicles.

Figure 3:
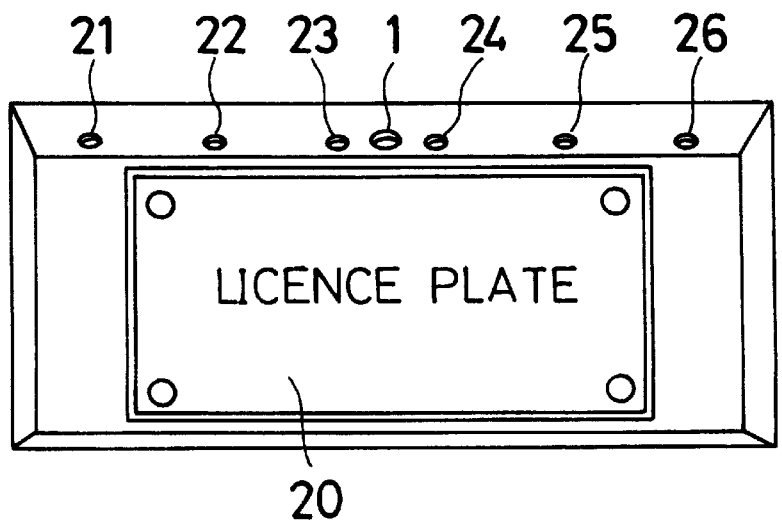
FIG. 3 is an elevational view of a rear license plate according to the present invention.

As shown in FIG. 3, the lights 2 are mounted on the upper portion of the rear license plate holder 20 at regular intervals. In this embodiment, the lights 2 are comprised of near infrared light emitting diodes.

In response to a headlight operation, the drive circuit 3 controls the operation of the light emitting diodes 21 to 26. As shown in FIG. 4, the drive circuit 3 has a small light switch 31 and a relay 32. The small light switch 31 is electrically connected with a battery 30 through a coil of the relay 32. When a vehicle operator turns on the small light switch 31, in response to the operation of the relay 32, the near infrared light emitting diodes 21 to 26 are turned on.

Based on the image from the CCD camera 1, the ECU 4 computes the distance between the vehicle body and the line on the road. When the distance is smaller than a first predetermined distance, the warning controller 6 generates a first warning. When the distance is smaller than a second predetermined distance, the warning controller 6 generates a second warning. In this embodiment, the second predetermined distance is smaller than the first predetermined distance. A speed sensor 41 and a select lever switch 42 are electrically connected to the ECU 4. The speed sensor 41 detects the vehicle speed and the select lever switch 42 detects a forward or a reverse mode. Further, a mute switch 43, a minus switch 44, a plus switch 45, a left turn switch 46 and a right turn switch 47 are electrically connected to the ECU 4. The mute switch 43 controls the warning controller 6. If the mute switch 43 is turned on, the warning controller 6 does not output a warning alarm. When the minus switch 44 is operated, the ECU 4 provides a delay signal to the warning controller 6 and delays the timing of the warning controller 6. On the other hand, when the plus switch 45 is operated, the ECU 4 provides an advance signal to the warning controller 6 and advances the timing of the warning controller 6. The left turn switch 46 and the right turn switch 47 control a left turn light and a right turn light, respectively.

Figure 5:
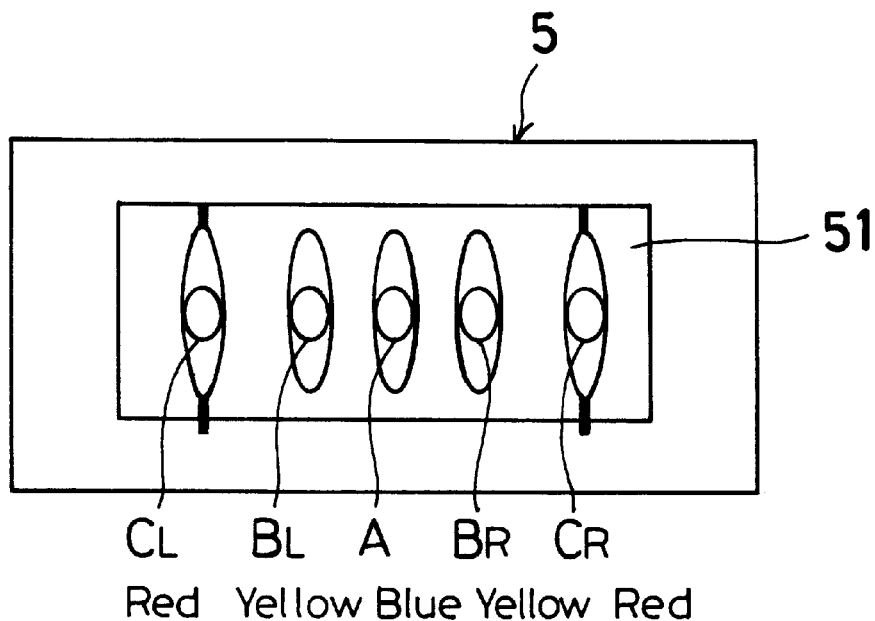
FIG. 5 is an enlarged view of a display according to the present invention.
Figure 6:
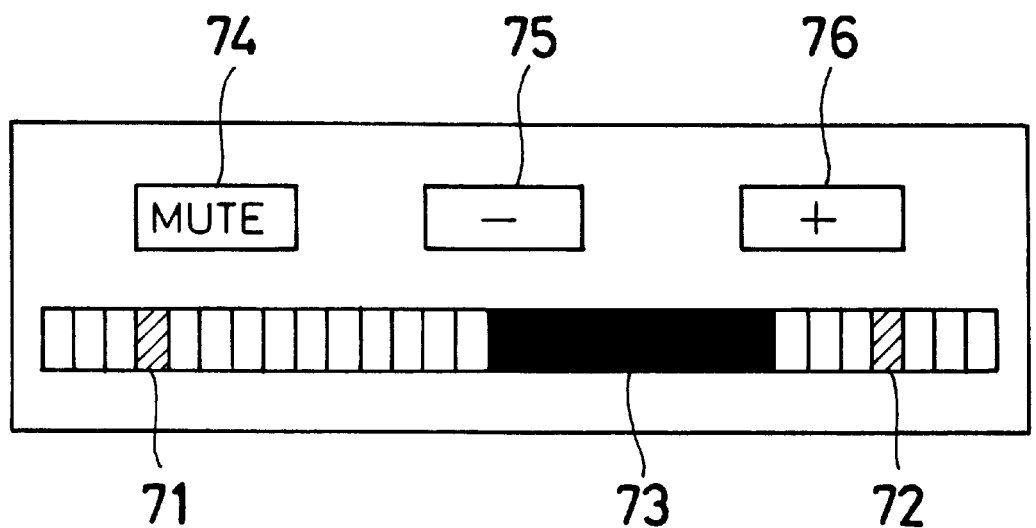
FIG. 6 is another embodiment of a display according to the present invention.

As shown in FIGS. 5 and 6, the display 5 indicates the distance condition between the vehicle and the lines on the road. Two lines on the road and vehicle location indicator lamp are represented on the display 5. The $C_L$ and $C_R$ lights are red lights. The $B_L$ and $B_R$ lights are yellow lights. The A light is a blue light. The two bold lines represent the lines on the road. In response to the vehicle location, one of the lights is lighted and represents a current vehicle location in the lane. FIG. 6 represents another embodiment of the display 5. In this embodiment, the indicator could represent the vehicle location continuously. In FIG. 6, the two lines on the road are designated 71 and 72. The vehicle is designated 73. Numerals 74, 75 and 76 represent a mute switch, a minus switch and a plus switch, respectively. A television monitor may be adapted for the display.

The warning controller 6 generates a warning alarm in response to the signal from the ECU controller 4. In the first warning stage (exceeds the first predetermined distance), the warning controller 6 generates a low-pitched and low volume warning alarm. In the second warning stage (exceeds the second predetermined distance), the warning controller 6 generates a high-pitched and loud volume warning alarm.

Figure 7:
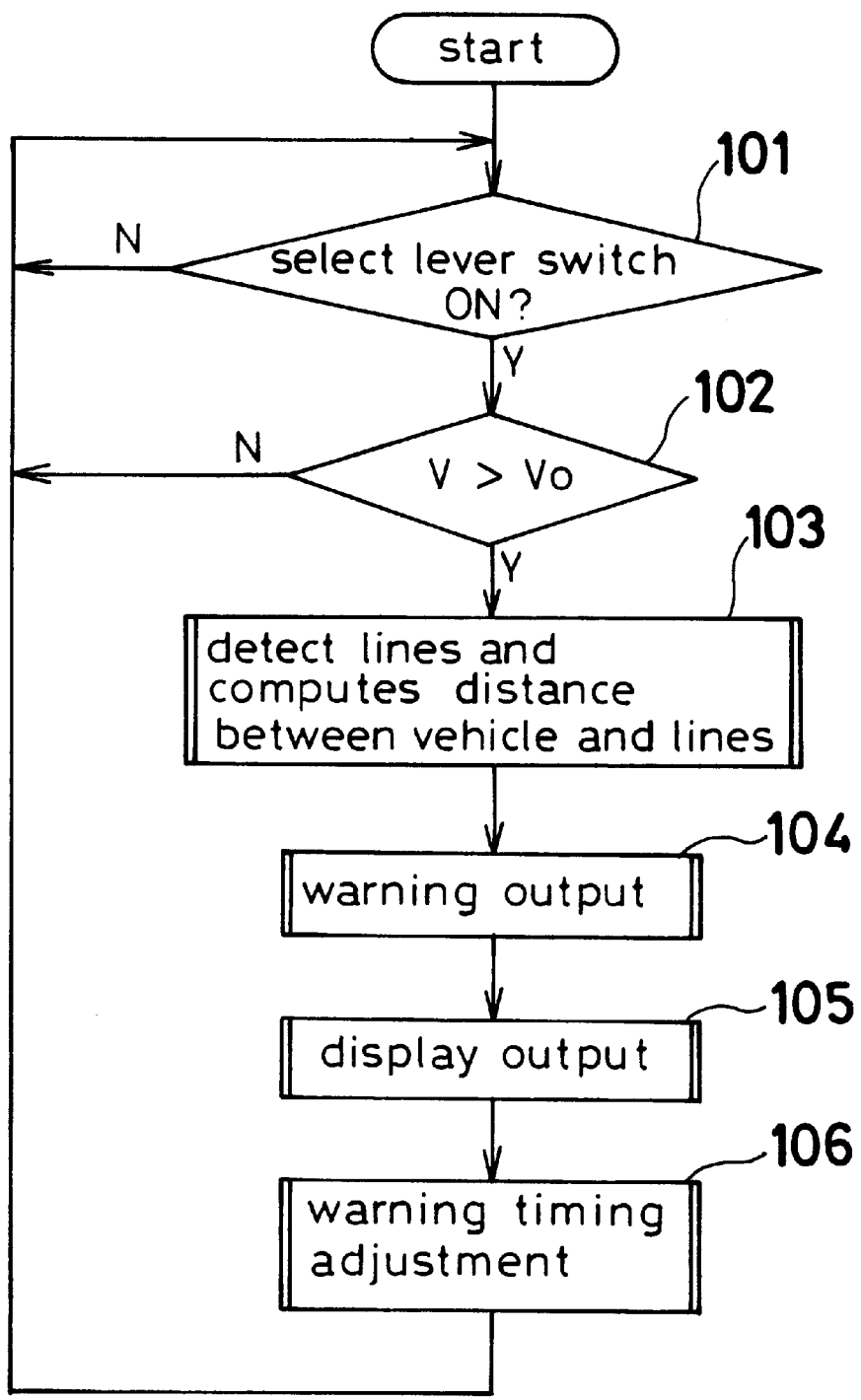
FIG. 7 is a main flow chart for image processing according to an embodiment of the present invention.

FIGS. 7 to 11 represent flow charts which are computed in the ECU 4. According to the above-described embodiment, the image processing is performed in accordance with flow charts as shown in FIGS. 7 to 11. FIG. 7 shows a main routine of the present invention.

Referring to FIG. 7, at step 101, the select lever switch condition is detected. When the select lever switch is in a forward position (equal to an ON condition), the program proceeds to step 102. On the contrary, when the select lever switch is in a reverse position (equal to a NO condition), the program returns to step 101. At step 102, a current speed value V is compared with a predetermined value $V_O$. When the speed value V is more than the predetermined value $V_O$, the program proceeds to step 103. When the speed value V is less than the predetermined value $V_O$, the program returns to step 101. Each of the steps 103 to 106 represent a subroutine, the details of which are disclosed hereinafter.

At step 103, the distance between the vehicle and the lines on the road is computed on the basis of the image information from the CCD camera 1. At step 104, a warning alarm output process is performed. At step 105, a display process is performed and at step 106, a warning timing adjusting process is performed.

Figure 8:
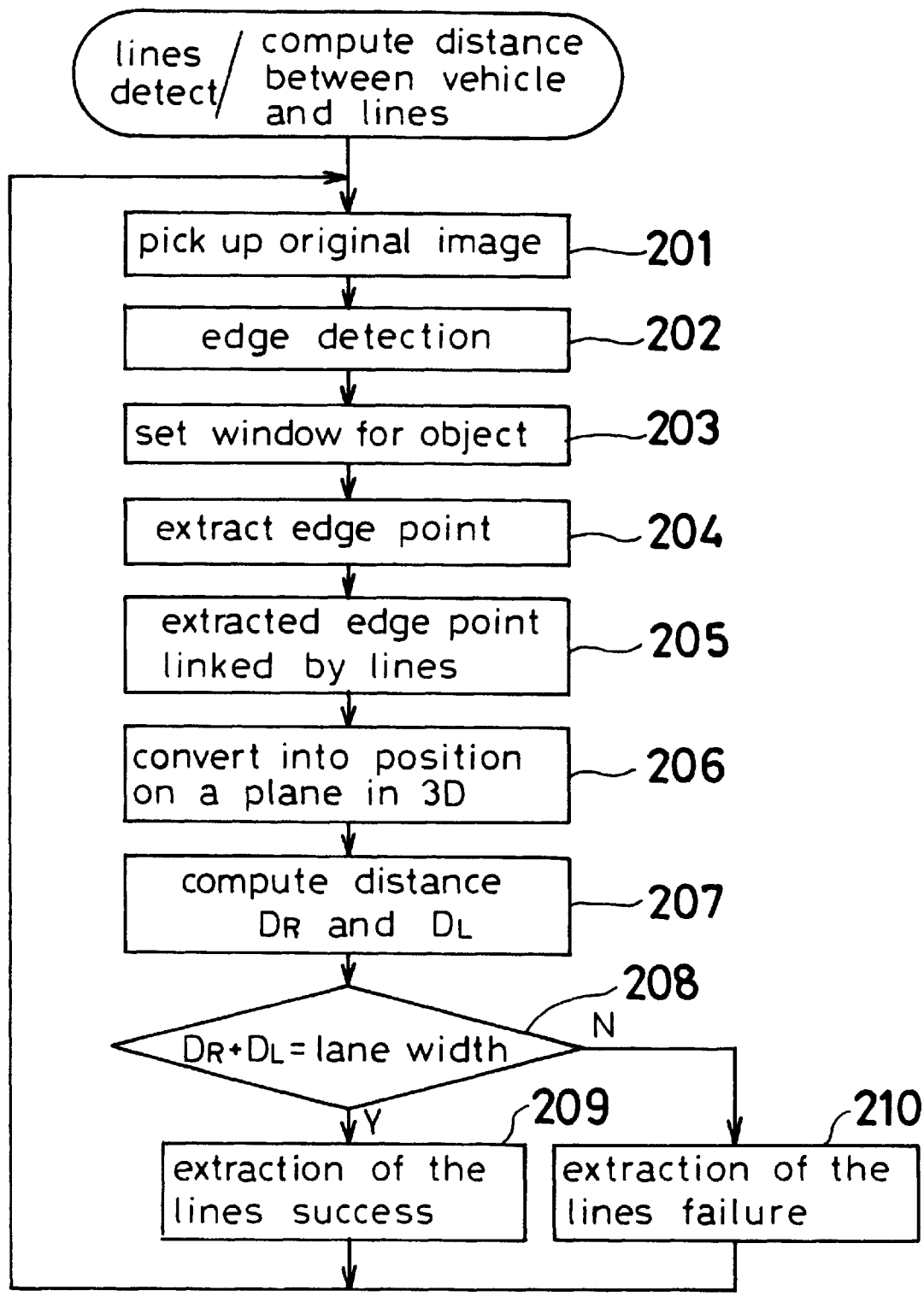
FIG. 8 is a flow chart for edge detection processing according to an embodiment of the present invention.
Figure 9:
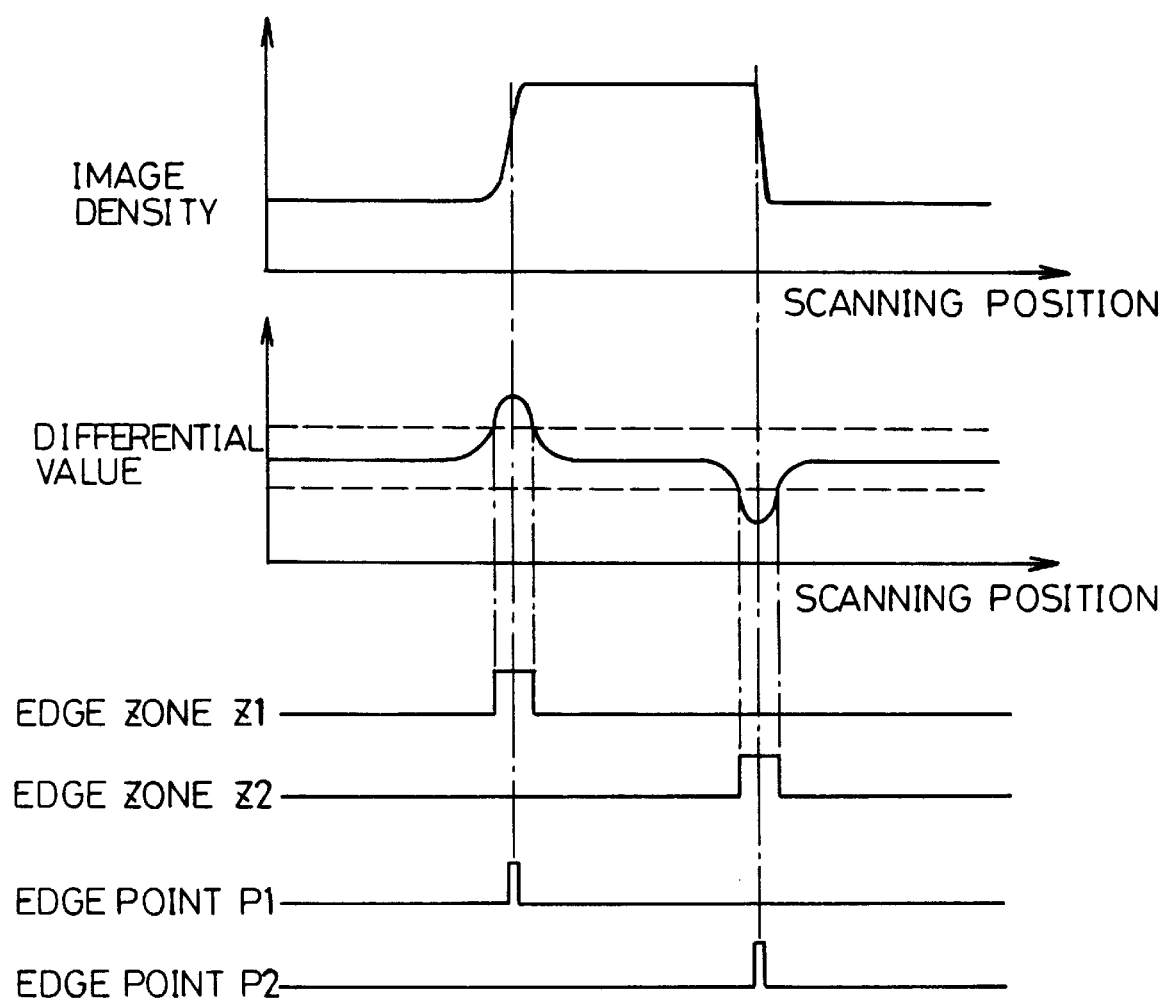
FIG. 9 is a graph showing detection of edge points according to an embodiment of the present invention.

Referring to FIG. 8, at step 201, all of the image signals output from the CCD camera 1 are fed into detection circuits (not shown) to introduce the image information. The edges are then detected at step 202. According to the present embodiment, edge points are obtained on the basis of the edges as shown in FIG. 9 and the x-coordinate and y-coordinate of each edge point are specified. At step 203, the window is set for the object at the present iteration step of the image processing.

FIG. 9 shows a method for extracting the edge points. At the outset, the signal indicative of the density of the image is differentiated to provide a differential value (peak value) which is processed by a binary process or in accordance with a predetermined threshold level to form edge point zones Z1, Z2. Then, in the middle of the edge point zones Z1, Z2, edge points P1, P2 are obtained by a process for narrowing the zones, respectively, for defining the outline of the object. While the edge points are used in the present embodiment in addition to the edges which are generally used for defining the outline, the edges which are generally used for defining the outline may be used as they are. The program then proceeds to step 204 where the logical product (AND) of the edge points is obtained on the basis of the edges at step 202 and the window for the object set at step 203, to extract the edge points which reside in the window.

Figure 10:
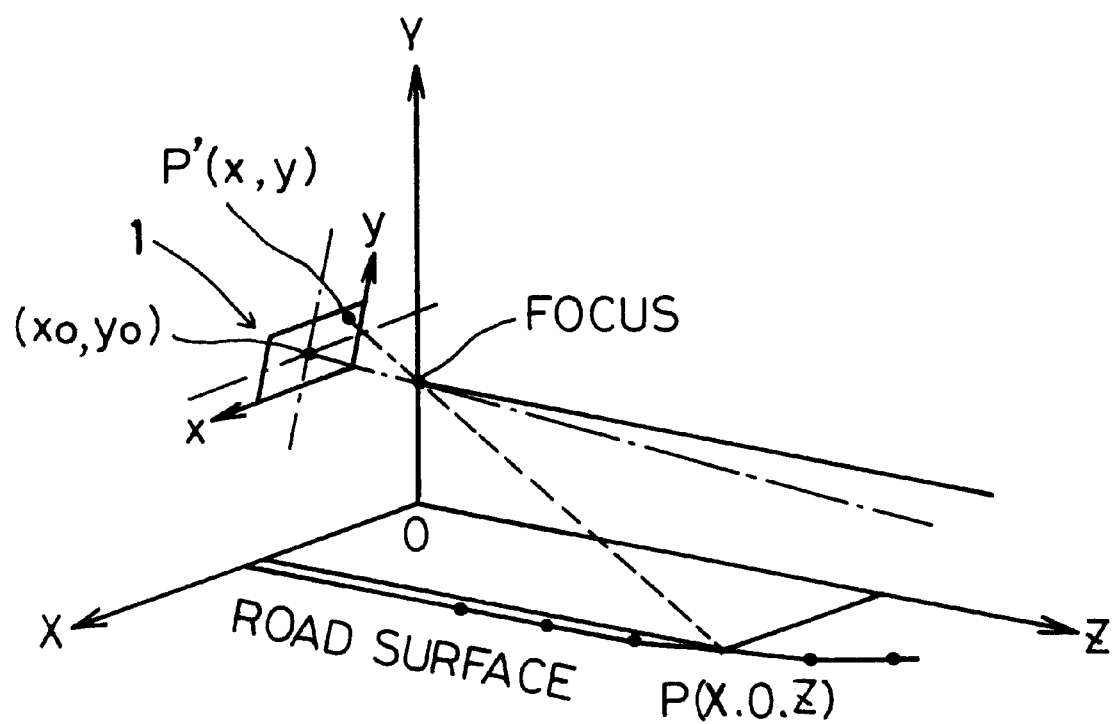
FIG. 10 is a diagram of a coordinate system showing edge points which are converted into positions on a plane in a three-dimensional system according to an embodiment of the present invention.

At step 205, the extracted edge points are linked by lines and right and left side boundaries of the road are determined by two linked lines. At step 206, the edge points on the image display which were extracted at step 204 are converted into positions on a plane in the three-dimensional geometric view, such that the edge points reside on the road surface, as shown in FIG. 10. While the coordinate axes X, Y are used for two-dimensional geometry, the coordinate axes X,Y,Z are used for the three-dimensional geometry in FIG. 10. In this embodiment, the extracted point P'(x,y) is converted into P(X,O,Y).

At step 207, each of the shortest distances $D_R$, $D_L$ between the CCD camera 1 and the extracted lines are computed. At step 208, the sum of $D_R$ and $D_L$ is compared with the memorized lane width $L_W$. When the sum of $D_R$ and $D_L$ is equal to the memorized lane width $L_W$, the program proceeds to step 209 where the extraction of the lines on the road is a decided success. When the sum of $D_R$ and $D_L$ is not equal to the memorized lane width $L_W$, the program proceeds to step 210 where the extraction of the lines on the road is a decided failure.

Figure 11:
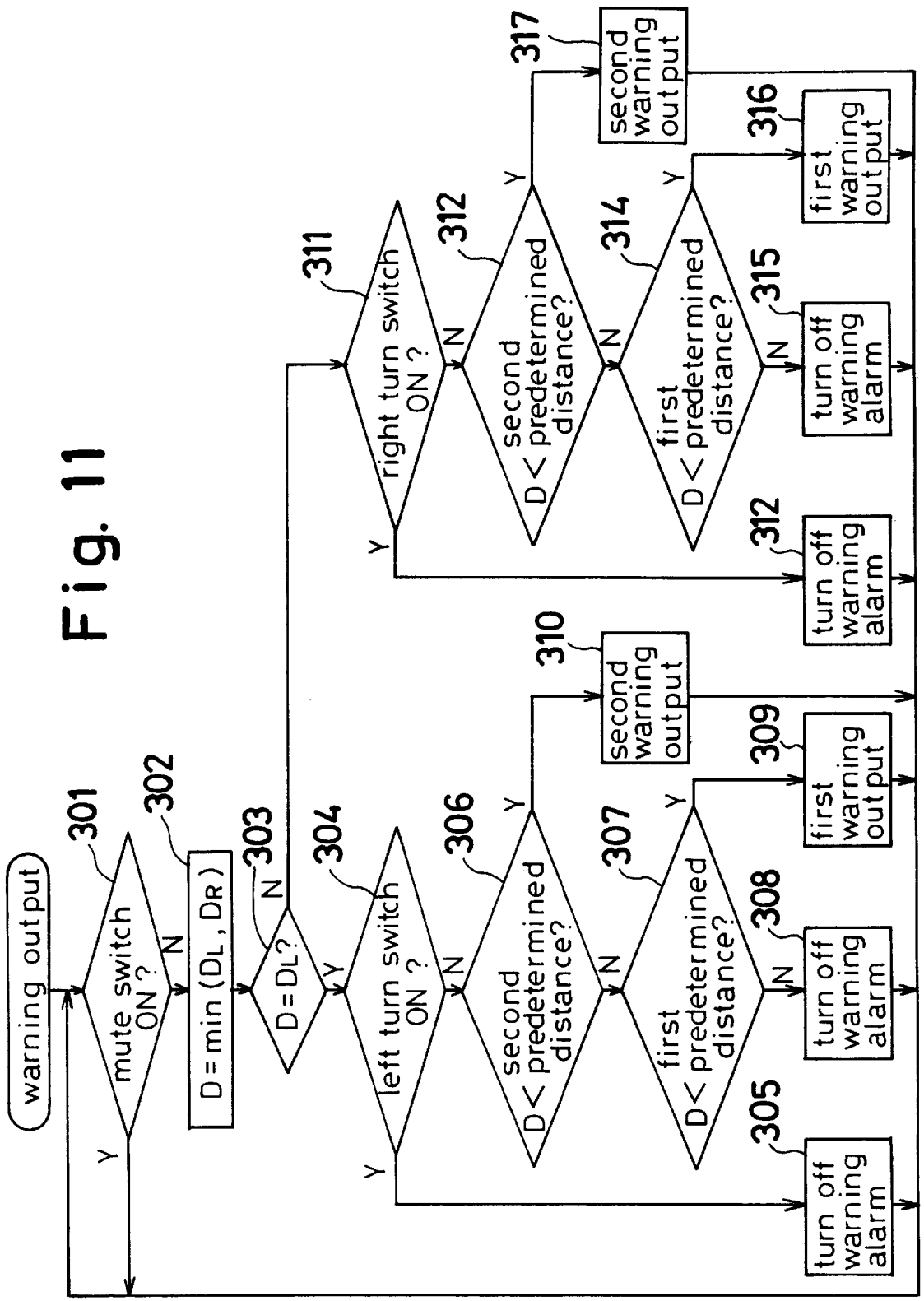
FIG. 11 is a flow chart for a warning alarm output processing according to an embodiment of the present invention.
Figure 14:
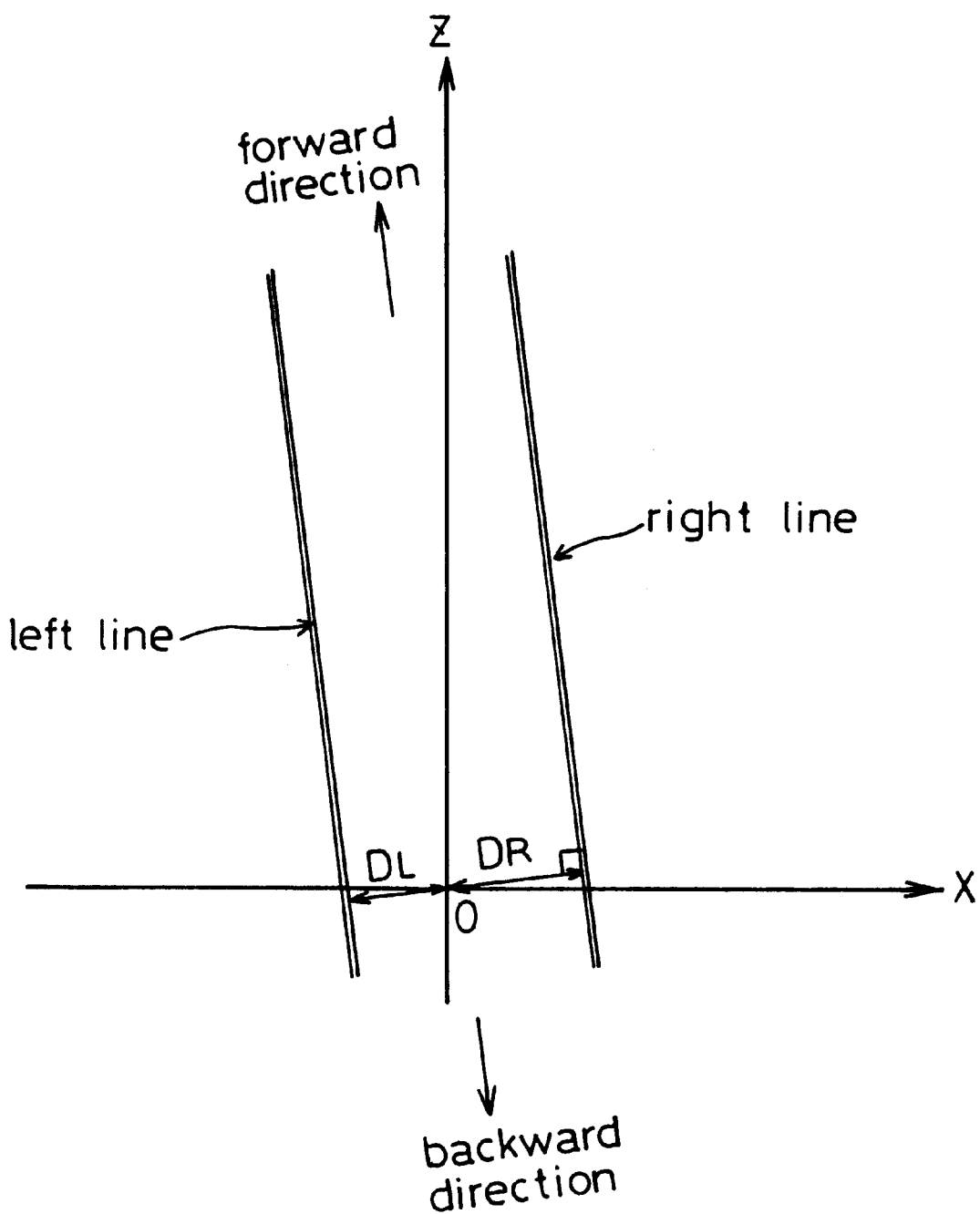
FIG. 14 shows a relation between a position of the CCD camera and a lane on the road.

The warning alarm output process at step 104 in FIG. 7 is explained in accordance with FIG. 11. At step 301, it is determined whether the mute switch 43 is turned on or not. If it is determined that the mute switch 43 is turned on, the operation of the warning alarm is stopped. If it is determined that the mute switch 43 is not turned on, the program proceeds to step 302. At step 302, the distance values of $D_L$ and $D_R$ are compared with each other. The relation between $D_L$ and $D_R$ is described in FIG. 14. One of the smaller distance values D is selected and memorized. At step 303, it is determined whether the selected smaller distance value D is equal to $D_L$ or not. If it is determined that the distance value is equal to $D_L$, the program proceeds to step 304, whereas if it is determined that the distance value is not equal to $D_L$, the program proceeds to step 311. At step 304, it is determined whether the left turn switch 46 is turned on or not. If it is determined that the left turn switch 46 is turned on, the program proceeds to step 305 and turns off the operation of the warning alarm, where if it is determined that the left turn switch 46 is not turned on, the program proceeds to step 306. At step 306, the selected smaller distance value D is compared with the second predetermined distance. When the selected smaller distance value D is less than the second predetermined distance, the program proceeds to step 310 and generates a second warning alarm. When the selected smaller distance value D is above the second predetermined distance, the program proceeds to step 307. At step 307, the selected smaller distance value D is compared with the first predetermined distance. When the selected smaller distance value D is less than the first predetermined distance, the program proceeds to step 309 and generates a first warning alarm. When the selected smaller distance value D is above the first predetermined distance, the program proceeds to step 308 and the operation of the warning alarm is stopped.

At step 311, it is determined whether the right turn switch 47 is turned on, or not. If it is determined that the right turn switch 47 is turned on, the program proceeds to step 312 and turns off the operation of the warning alarm, whereas if it is determined that the right turn switch 47 is not turned on, the program proceeds to step 312. At step 312, the selected smaller distance value D is compared with the second predetermined distance. When the selected smaller distance value D is less than the second predetermined distance, the program proceeds to step 317 and generates a second warning alarm. When the selected smaller distance value D is above the second predetermined distance, the program proceeds to step 314. At step 314, the selected smaller distance value D is compared with the first predetermined distance. When the selected smaller distance value D is less than the first predetermined distance, the program proceeds to step 316 and generates a first warning alarm. When the selected smaller distance value D is above the first predetermined distance, the program proceeds to step 315 and the operation of the warning alarm is stopped.

Figure 12:
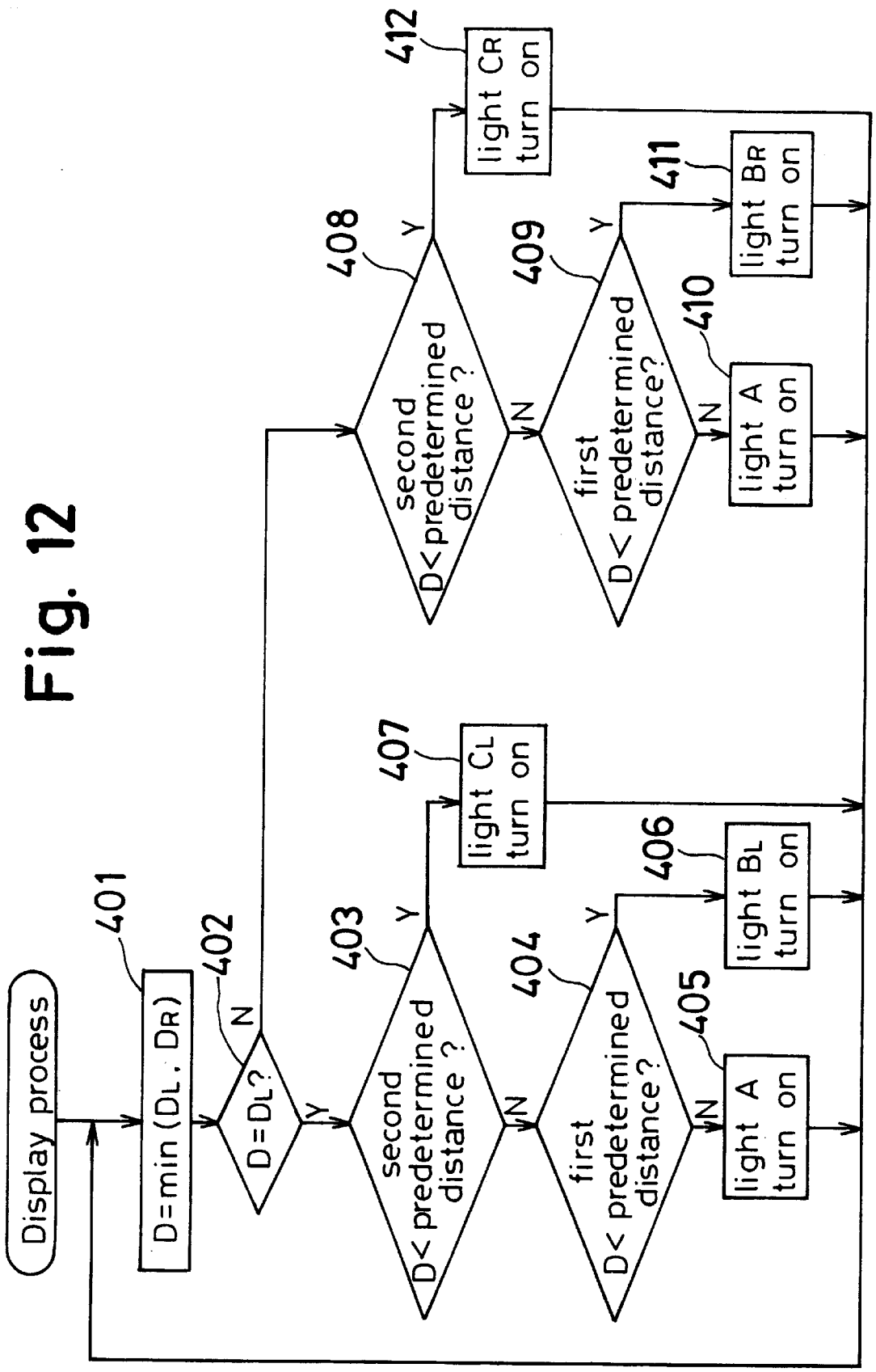
FIG. 12 is a flow chart for display processing according to an embodiment of the present invention.

The display process at step 105 in FIG. 7 is explained in accordance with FIG. 12. At step 401, the distance values of $D_L$ and $D_R$ are compared with each other. The relation between $D_L$ and $D_R$ are described in FIG. 14. One of the smaller distance value D is selected and memorized. At step 402, it is determined whether the selected smaller distance value D is equal to $D_L$ or not. If it is determined that the distance value is equal to $D_L$, the program proceeds to step 403, whereas if it is determined that the distance value is not equal to $D_L$, the program proceeds to step 408. At step 403, the selected smaller distance value D is compared with the second predetermined distance. When the selected smaller distance value D is less than the second predetermined distance, the program proceeds to step 407 and turns on the light $C_L$. When the selected smaller distance value D is above the second predetermined distance, the program returns to step 404. At step 404, the selected smaller distance value D is compared with the first predetermined distance. When the selected smaller distance value D is less than the first predetermined distance, the program proceeds to step 406 and turns on the light $B_L$. When the selected smaller distance value D is above the first predetermined distance, the program proceeds to step 405 and the light A is turned on.

At step 408, the selected smaller distance value D is compared with the second predetermined distance. When the selected smaller distance value D is less than the second predetermined distance, the program proceeds to step 412 and turns on the light $C_R$. When the selected smaller distance value D is above the second predetermined distance, the program proceeds to step 409. At step 409, the selected smaller distance value D is compared with the first predetermined distance. When the selected smaller distance value D is less than the first predetermined distance, the program proceeds to step 411 and turns on the light $B_R$. When the selected smaller distance value D is above the first predetermined distance, the program proceeds to step 410 and the light A is turned on.

Figure 13:
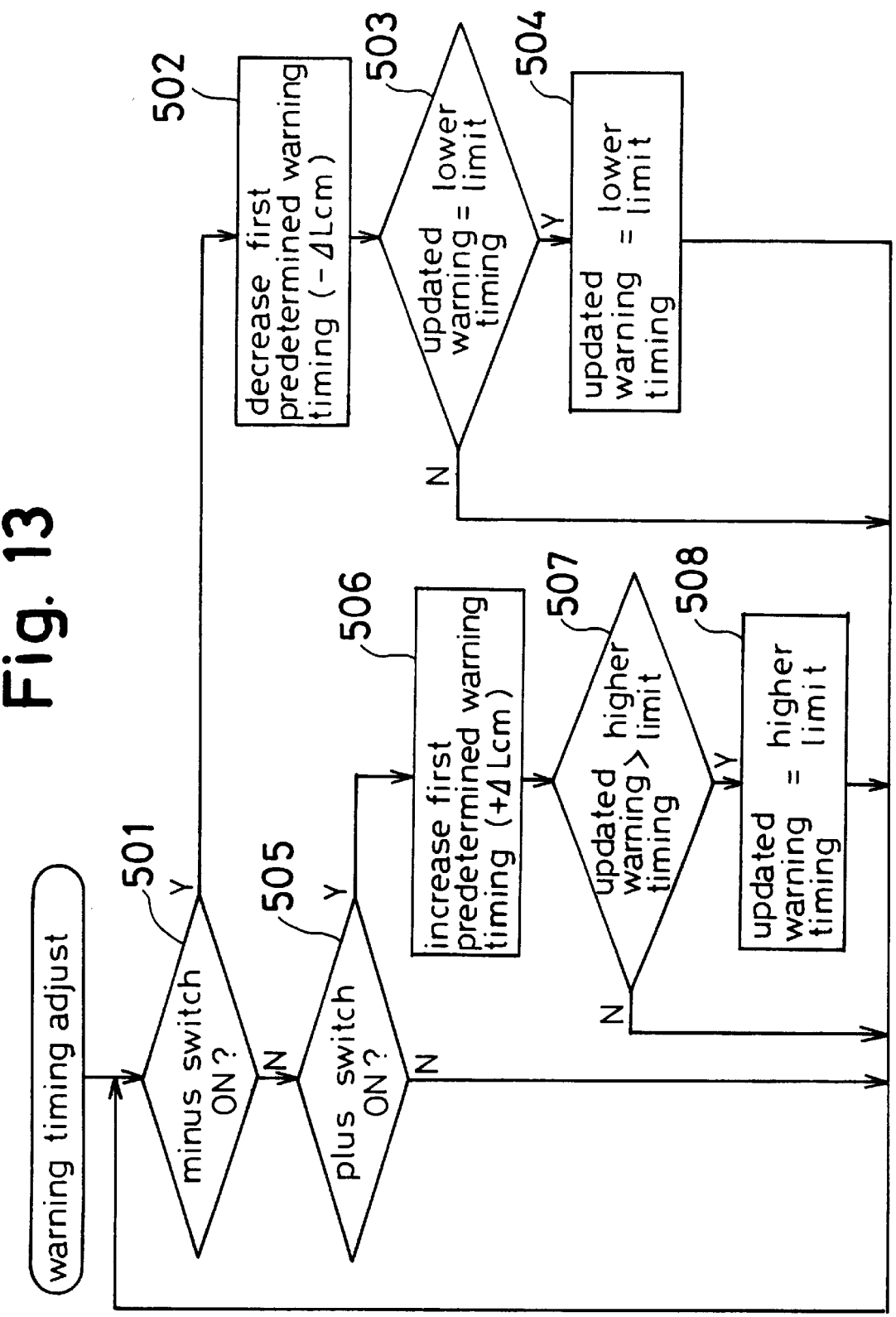
FIG. 13 is a flow chart for warning timing adjusting processing according to an embodiment of the present invention.

The warning timing adjusting process at step 106 in FIG. 7 is explained in accordance with FIG. 13. At step 501, it is determined whether the minus switch 44 is operated or not. If it is determined that the minus switch 44 is operated, the program proceeds to step 502. If it is determined that the minus switch 44 is not operated, the program proceeds to step 505. At step 505, it is determined whether the plus switch 45 is operated or not. If it is determined that the plus switch 45 is operated, the program proceeds to step 506. If it is determined that the plus switch 45 is not operated, the program returns to step 501. At step 502, the first predetermined warning timing is decreased. In this embodiment, a decrement value is determined ΔLcm. In accordance with the number of times the minus switch 44 is operated, the decrement value is increased. At step 503, it is determined whether the updated warning timing is compared with the lower limit. If it is determined that the updated warning timing is less than the lower limit, the program proceeds to step 504, whereas if it is determined that the updated warning timing is not less than the lower limit, the program returns to step 501. At step 504, the updated warning timing is fixed to the lower limit. In this embodiment, the lower limit is equal to a second warning timing. At step 506, the first predetermined warning timing is increased. In this embodiment, an increment value is determined ΔLcm. In accordance with the number of times the plus switch 45 is operated, the increment value is increased. At step 507, the updated warning timing is compared with the higher limit. If it is determined that the updated warning timing is above the higher limit, the program proceeds to step 508, whereas if it is determined that the updated warning timing is not above the lower limit, the program returns to step 501. At step 508, the updated warning timing is fixed to the higher limit. In this embodiment, the higher limit is determined to be 1.2 m.

While the invention has been particularly shown and described with reference to preferred embodiments thereof, it will be understood by those in the art that the foregoing and other changes in form and details may be made therein without departing from the spirit and scope of the invention.

What is claimed is:

1. A vehicle condition detecting apparatus comprising:
   means for detecting an image in a rear region behind the vehicle;
   means for processing said image including means for detecting lines indicative of lane boundaries on a road based on density of said image;
   means for providing a warning when distances between the vehicle and said lines exceed predetermined values, respectively; and
   lighting means for lighting the rear region behind said vehicle, said lighting means comprising a near infrared light source.

2. A vehicle condition detecting apparatus as set forth in claim 1, further comprising display means connected to said means for detecting lines for showing position of vehicle relative to said lines.

3. A vehicle condition detecting apparatus as set forth in claim 1, wherein said means for providing a warning provides two warnings with respect to first and second predetermined distances.

4. A vehicle condition detecting apparatus as set forth in claim 3, wherein said first predetermined distance is higher than said second predetermined distance.

5. A vehicle condition detecting apparatus as set forth in claim 3, further comprising said means for providing a warning includes an increment switch and a decrement switch which can modify said first predetermined distance.

6. A vehicle condition detecting apparatus comprising:
   means for detecting an image in a rear region behind the vehicle;
   means for processing said image including means for detecting lines indicative of lane boundaries on a road based on density of said image;

means for providing a warning when distances between the vehicle and said lines exceed predetermined values, respectively; and lighting means for lighting the rear region behind said vehicle, wherein said lighting means are mounted on an upper portion of a rear license plate holder.

7. A vehicle condition detecting apparatus as set forth in claim 6, further comprising display means connected to said means for detecting lines for showing position of vehicle relative to said lines.

8. A vehicle condition detecting apparatus as set forth in claim 6, wherein said means for providing a warning provides two warnings with respect to first and second predetermined distances.

9. A vehicle condition detecting apparatus as set forth in claim 8, wherein said first predetermined distance is higher than said second predetermined distance.

10. A vehicle condition detecting apparatus as set forth in claim 8, further comprising said means for providing a warning includes an increment switch and a decrement switch which can modify said first predetermined distance.

* * * * *